(12) United States Patent
Hamburg

(10) Patent No.: US 12,579,320 B2

(45) Date of Patent: Mar. 17, 2026

---

(54) SPLIT COUNTERS WITH DYNAMIC EPOCH TRACKING FOR CRYPTOGRAPHIC PROTECTION OF SECURE DATA

(71) Applicant: Cryptography Research, Inc, San Jose, CA (US)

(72) Inventor: Michael Alexander Hamburg, 's-Hertogenbosch (NL)

(73) Assignee: Cryptography Research, Inc, San Jose, CA (US)

( * ) Notice: Subject to any disclaimer, the term of this patent is extended or adjusted under 35 U.S.C. 154(b) by 211 days.

(21) Appl. No.: 18/500,975

(22) Filed: Nov. 2, 2023

(65) Prior Publication Data

US 2024/0152655 A1    May 9, 2024

Related U.S. Application Data

(60) Provisional application No. 63/422,332, filed on Nov. 3, 2022.

(51) Int. Cl.
| | |
|---|---|
| *G06F 21/64* | (2013.01) |
| *G06F 21/60* | (2013.01) |
| *G06F 21/78* | (2013.01) |

(52) U.S. Cl.
CPC ............ *G06F 21/64* (2013.01); *G06F 21/602* (2013.01); *G06F 21/78* (2013.01)

(58) Field of Classification Search
CPC ........ G06F 21/602; G06F 21/64; G06F 21/78; H04L 9/0637
See application file for complete search history.

(56) References Cited

U.S. PATENT DOCUMENTS

| | | | |
|---|---|---|---|
| 10,042,780 B2 | 8/2018 | Bowler | |
| 10,540,297 B2 | 1/2020 | Saileshwar et al. | |
| 10,733,313 B2 | 8/2020 | Ramrakhyani et al. | |
| 11,088,846 B2 | 8/2021 | Chhabra et al. | |
| 11,374,967 B2 | 6/2022 | Chen et al. | |
| 2016/0267024 A1* | 9/2016 | Bowler | G06F 3/0623 |
| 2019/0229924 A1* | 7/2019 | Chhabra | H04L 9/3242 |
| 2019/0251275 A1* | 8/2019 | Ramrakhyani | G06F 21/6218 |
| 2021/0058237 A1* | 2/2021 | Sandberg | G06F 21/72 |

(Continued)

OTHER PUBLICATIONS

G. Saileshwar, P. J. Nair, P. Ramrakhyani, W. Elsasser, J. A. Joao and M. K. Qureshi, "Morphable Counters: Enabling Compact Integrity Trees for Low-Overhead Secure Memories," 2018 51st Annual IEEE/ACM International Symposium on Microarchitecture (MICRO), Fukuoka, Japan, 2018, pp. 416-427 (Year: 2018).*

(Continued)

*Primary Examiner* — Jeremy S Duffield

(74) *Attorney, Agent, or Firm* — Lowenstein Sandler LLP

(57) ABSTRACT

Aspects and implementations include systems and techniques for efficient protection of secret data against replay attacks, including updating a unit of data of a plurality of units of data, updating an individual portion of a counter for the unit of data, the counter including an individual portion and a common portion, accessing a pointer value that distinguishes counters corresponding to a first epoch from counters corresponding to a second epoch, selecting, based on at least the pointer value and a value of the individual portion of the counter, an update value, and modifying the pointer value using the update value.

20 Claims, 6 Drawing Sheets

(56) References Cited

U.S. PATENT DOCUMENTS

2021/0311640 A1 * 10/2021 Elad .................... G06F 16/9027
2023/0017231 A1 * 1/2023 Ozga ..................... H04L 9/3242

OTHER PUBLICATIONS

Chenyu Yan, D. Englender, M. Prvulovic, B. Rogers and Yan Solihin, "Improving Cost, Performance, and Security of Memory Encryption and Authentication," 33rd International Symposium on Computer Architecture (ISCA'06), Boston, MA, 2006, pp. 179-190 (Year: 2006).*
Amro Awad, Pratyusa Manadhata, Stuart Haber, Yan Solihin, and William Horne. 2016. Silent Shredder: Zero-Cost Shredding for Secure Non-Volatile Main Memory Controllers. SIGPLAN Not. 51, Apr. 4, 2016, pp. 263-276. (Year: 2016).*

\* cited by examiner

400

500

Access 2nd unit of data  510

Access MAC for 2nd unit of data  520

Determine, using the pointer value, a value of 2nd counter associated with 2nd unit of data  530

Determine, using the MAC and the value of 2nd counter, whether integrity of 2nd unit of data has been breached  540

600

Processing Device 602

Processing Logic
626

Main Memory 604

Instructions
622

Static Memory
606

Network Interface
Device
608

Network
620

630

Video Display
610

Alpha-Numeric
Input Device
612

Cursor Control
Device
614

Signal Generation
Device
616

Data Storage Device 618

Computer-Readable
Storage Medium 624

Instructions
622

SPLIT COUNTERS WITH DYNAMIC EPOCH TRACKING FOR CRYPTOGRAPHIC PROTECTION OF SECURE DATA

RELATED APPLICATIONS

This application claims the benefit of U.S. Provisional Patent Application No. 63/422,332, filed Nov. 3, 2022, entitled "SPLIT COUNTERS WITH DYNAMIC EPOCH TRACKING FOR CRYPTOGRAPHIC PROTECTION OF SECURE DATA," which is incorporated by reference herein.

TECHNICAL FIELD

The disclosure pertains to computing applications, more specifically to systems and techniques that protect secret data against unauthorized accesses and malicious attacks.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
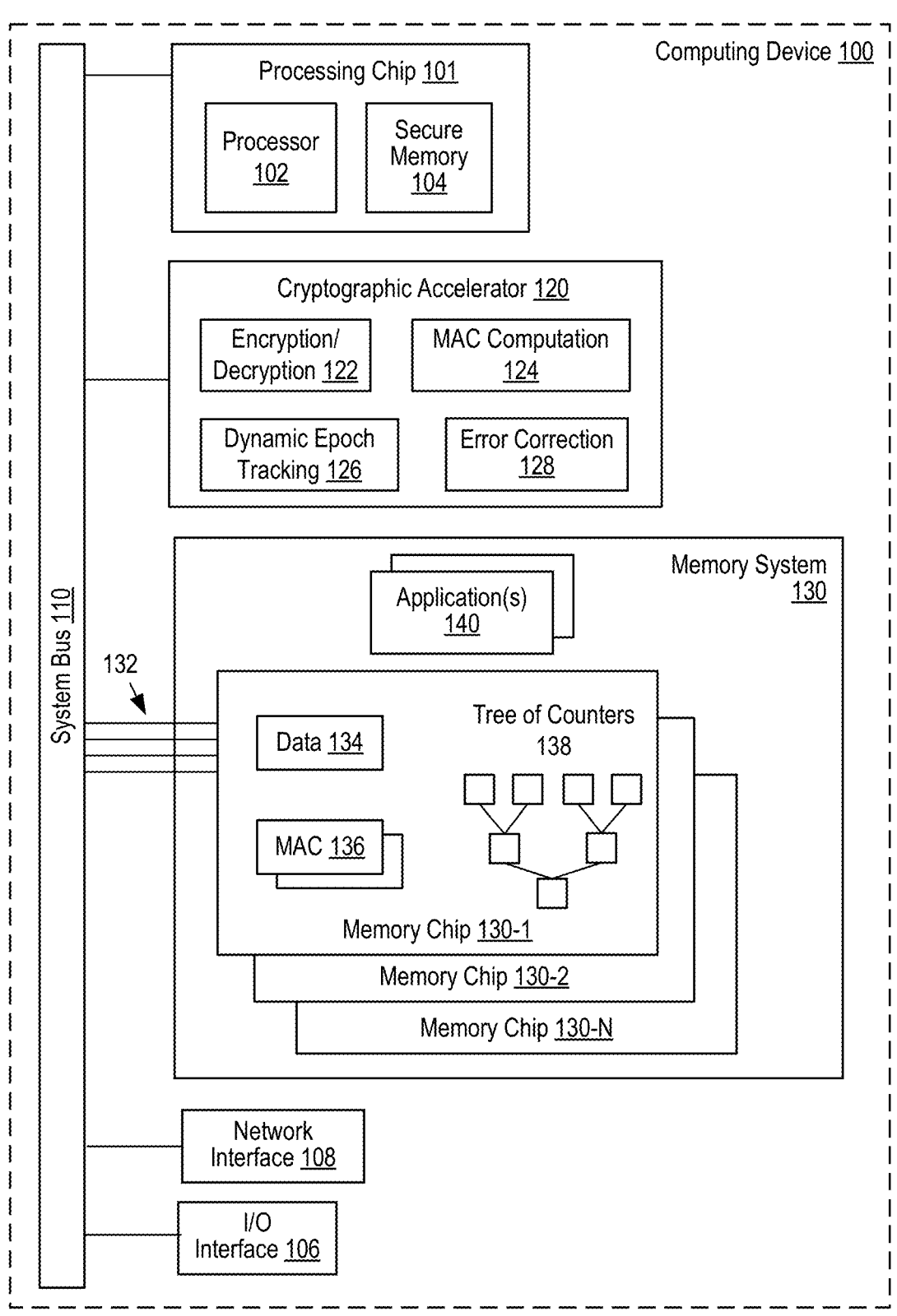
FIG. 1 is a block diagram of an example computer system in which implementations of the disclosure may operate.

Aspects and implementations of the present disclosure are related to systems and techniques that protect secret data against attacks by adverse parties. Such attacks may come in a variety of forms, including attempts to replace the data or a part of the data (spoofing attacks), replacing a path to the stored data with a path to a different data (splicing attacks), replacing the current data with an earlier version of the same data (replay attacks), and so on. Protection against spoofing attacks may include encrypting data and computing and storing an authentication tag for the data, also commonly referred to as a message authentication code (MAC), e.g., in the course of encryption of the data, according to a suitable authentication algorithm. When the data is read from memory (or received over a network) and decrypted, a verification MAC may be computed using the decrypted data and compared with the stored MAC. A mismatch between the stored MAC and the verification MAC indicates that the data has been replaced with some other spoofing data. On the other hand, modifying a MAC to match the spoofing data may be impossible without gaining access to the cryptographic key used in encryption of the data. Storing MACs in addition to the data allows using unsecured memory to store secure data.

A replay attack, however, may replace both the data and the MAC with their earlier, correctly matching, versions. To protect against such replay attacks, a counter is usually introduced whose value is increased each time a new version of the data is being stored. The counter value may be incorporated into the encryption/MAC generation process. During the verification process, the current counter value may be retrieved and used in generation of the verification MAC. To prevent a replay attacker from replacing the current counter with an earlier value together with the earlier version of the data/MAC, the counter needs to be stored securely or at least authenticated with its own MAC. Since typical applications may operate with millions and even billions of units of data (blocks, parcels, messages, etc.) counters are often arranged in the form of a tree that reduces the number of deployed counters exponentially. In particular, a group of R blocks of data may be protected with R counters of the first (top) level of the tree authenticated with a single MAC, which in turn is protected against a replay attack with a counter of the second level of the tree. Correspondingly, each group of R (or some other number of) counters of the first level is protected with one authenticated counter of the second level. The tree may include multiple levels of such hierarchical counters with a group of R (or some other number of) counters of nth level authenticated with one counter of n+1th level until a small number of counters (e.g., one or several) of the last root (bottom) level is reached, which may be stored in a secure memory (e.g., an on-chip memory). As a result, an L-level (not counting the root level) tree of counters can authenticate $R^L$ counters and thus protect $R^L$ blocks of data against replay attacks. For example, L=10 levels with radix R=8 would be sufficient to protect a billion blocks of data. Each data read operation involves accessing $R^L+1$ counters and verifying L MACs that authenticate the vertical chain of L groups of R counters stored in the unsecured memory; R counters of a given level and a corresponding MAC can be fetched as parts of a single block read. During a write operation into a given data block, updating a counter of the data block also involves updating and storing L updated MACs that authenticate the chain of L groups of counters.

Reduction of the number of intermediate operations and memory needed to store the counters may be achieved by increasing the number of counters R that fit on a single branch of the tree and, correspondingly, reducing the number L of the tree levels to support the same number $R^L$ of stored blocks of data. One way of achieving this is by using split counters. Split counters share a common portion, e.g., D most significant bits of each counter, but maintain separate lower portions, e.g., d least significant bits of each counter. A value of the common portion E indicates an epoch in which the counters currently reside while individual portions $c_i$ indicate where each counter i is within the current epoch. The value $C_i$ of the ith counter is then obtained, e.g., by concatenating the common (epoch) value E with the respective individual portion: $C_i = E \| c_i$. For example, where a 512-bit block would be used to store eight (R=8) 56-bit conventional counters and one 64-bit MAC value, the split counter techniques allow to set up 64 counters with a 64-bit (D=64) common portion and 64 individual 6-bit (d=6)

portions. This enables representing any given number of blocks with twice fewer number of levels, $L'=L/2$, compared with conventional counters. As a result, each data read operation may involve fetching only $L'=L/2$ blocks of split counters and the same number of MACs (e.g., 64 counters and one MAC per block in the above example) and the root counter.

When any given value $c_i$ reaches the maximum value (overflows), e.g., value $2^d$, the epoch value is incremented $E \rightarrow E+1$ for all counters. The individual potions $c_i$ may then be nullified $c_i \rightarrow 0$ to delay the moment when any one counter reaches the maximum value again and the new epoch change takes place. An epoch change triggers a significant amount of computations, including recomputation of all MACs that authenticate the entire group of R data values (which may include decrypting and then re-encrypting these values if the counter is integrated into the encryption algorithm) and all associated MACs that authenticate various counters. Such sporadic avalanche-type computations caused by the epoch changes create processing bottlenecks that significantly increase latency of memory operations.

Aspects of the present disclosure address the above noted and other challenges of the existing secure memory access technology by enabling systems and techniques that eliminate such bottlenecks by spreading computations caused by epoch changes more uniformly over the course of many instances of memory writes/updates. More specifically, among a sequence of counters that are authenticated by a shared MAC may be counters that are associated with different epochs, e.g., a current epoch E and the next epoch $E+1$. Initially, all counters may be on the same epoch E, such that ith counter value is $C_i=E\|c_i$ As various counters are updated as a result of write operations of the respective data, a dynamic pointer P begins to progress along the sequence of counters. At any given instance, those counters that have been reached by pointer P are advanced to the next epoch, with the respective counter values being, e.g., $C_{i\leq P}=E+1\|c_i$, whereas counters that have not yet been reached by pointer P remain on the current epoch, $C_{i>P}=E\|c_i$.

Each time a write operation is performed, a decision may be made whether to advance the pointer $P \rightarrow P+U$ with $U \neq 0$ or maintain it at its current position ($U=0$). Various rules for advancing or maintaining the pointer may be used based on target conditions. In some implementations, the rules may be set to allow any counter to be reached by pointer P before that counter has a chance to overflow (e.g., when the associated data is repeatedly overwritten at a rate that is substantially higher than the average rate for the data in the sequence). Additionally, to disfavor large jumps of pointer P (which may cause many MAC values to be recomputed and many units of data to be decrypted and then re-encrypted at once), the rules may prescribe that the pointer is moved by at most $U_{max}$ (e.g., 1, 2, 4, or any suitable value). In particular, when ith counter is updated, e.g., $c_i \rightarrow c_i+1$, the distance from the pointer to ith counter, $i-P$, may be evaluated in view of the number of writes remaining before the counter overflows, $\Delta_i=2^d-c_i$. The advance of the pointer may be selected from, e.g., $U=0, 1 \ldots U_{max}$, with no advance or a small advances favored for small values of $(i-P)/\Delta_i$ (the pointer is close to ith counter) and larger advances closer to $U_{max}$ favored for large values of $(i-P)/\Delta_i$ (the pointer is far from ith counter). When pointer P reaches the end of the sequence, $P=R$, and all counters are on the next epoch $E+1$, the common counter portion may be incremented, $E \rightarrow E+1$, and pointer P may begin a new progression through the sequence of counters, now tracking the boundary between counters on the current epoch $E+1$ and counters on the next epoch $E+2$, and so on.

The advantages of the disclosed techniques include but are not limited to elimination of overflow bottlenecks in secure memory storage operations that use split counters. This reduces the latency of memory operations and improves the overall efficiency of handling confidential data.

FIG. 1 is a block diagram illustrating an example computing device 100 in which implementations of the present disclosure may operate. Computing device 100 may be a desktop computer, a tablet, a smartphone, a server (local or remote), a thin/lean client device, a server, a cloud computing node, an edge device, a network switch, a gateway device, a card reader, a wireless sensor node, an Internet-of-Things (IoT) node, an embedded system dedicated to one or more specific applications, and so on. Computing device 100 may have one or more processors 102, e.g., central processing units (CPUs), graphics processing units (GPUs), field-programmable gate arrays (FPGA), application-specific integrated circuits (ASICs), and the like. "Processor" refers to a device capable of executing instructions encoding arithmetic, logical, or I/O operations. In one illustrative example, a processor may follow Von Neumann architectural model and may include one or more arithmetic logic units (ALUs), and a control unit. Processor 102 may have access to a secure memory 104, which may include cache, one or more registers, and/or other trusted memory devices. In some implementations, processor 102 and secure memory 104 may be implemented on a single processing chip 101, e.g., as part of the same silicon die.

Processor 102 may include one or more processor cores. In some implementations, each processor core may execute instructions to run a number of hardware threads, also known as logical processors. Various logical processors (or processor cores) may be assigned to one or more processes supported by processor 102, although more than one processor core (or a logical processor) may be assigned to a single processor for parallel processing. A multi-core processor may simultaneously execute multiple instructions. A single-core processor may typically execute one instruction at a time (or process a single pipeline of instructions).

Computing device 100 may include a cryptographic accelerator (cryptographic engine, cryptographic coprocessor, etc.) 120. Cryptographic accelerator 120 may be any circuit or a collection of circuits designed to improve efficiency and/or security of cryptographic computations. In some implementations, cryptographic accelerator 120 may include an encryption/decryption component 122 that performs encryption of various units (blocks, parcels, messages) of secret data prior to storing the secret data in a memory (e.g., memory system 130) and/or communicating the secret data to any other computing device, e.g., over a network connection. Similarly, encryption/decryption component 122 may perform decryption of encrypted data after reading the encrypted data from memory or upon receiving the encrypted data from another computing device. Encryption/decryption component 122 may implement encryption according to any symmetric key cryptographic algorithm, public/private key cryptographic algorithm, digital signature algorithm, and the like. In some implementations, encryption/decryption component 122 may further include a MAC computation component 124 that may compute message authentication tags (or codes) for secret data. In some instances, MAC computation component 124 may operate in conjunction with encryption/decryption component 122, e.g., by computing MACs of data that is being encrypted.

MAC computation component 124 may further compute verification MACs of any retrieved data, including data being decrypted, and use the verification MACs to verify integrity of the decrypted secret data.

Cryptographic accelerator 120 may further include dynamic epoch tracking component 126 that supports operations of split counters with multiple epoch tracking, according to various implementations of the present disclosure. Operations of dynamic epoch tracking component 126 may be performed in conjunction with encryption and decryption of secret data and may further include MAC computations. Cryptographic accelerator 120 may also include an error correction (EC) component 128 that implements any suitable EC algorithm capable of detecting and, in some implementations, correcting a certain number of errors that occur as a result of processing, storing, and/or retrieving data. For example, EC component 128 may implement Reed-Solomon codes, Bose-Chaudhuri-Hocquenghem codes, Hamming codes, Single Error Correction Double Error Detection (SECDED) codes, and/or other suitable EC techniques and algorithms.

Although cryptographic accelerator 120 is shown as separate from processing chip 101, in some implementations, cryptographic accelerator may be designed and manufactured as part of processing chip 101. In some implementations, various components of cryptographic accelerator 120 may be implemented as hardware circuits. In some implementations, one or more components of cryptographic accelerator 120 may be implemented as software (and/or firmware) modules, or as a combination of one or more software/firmware modules and/or one or more hardware circuits.

Computing device 100 may include one or more memory systems 130. Memory system 130 may refer to any volatile or non-volatile memory and may include a read-only memory (ROM), a random-access memory (RAM), electrically erasable programmable read-only memory (EEPROM), flash memory, flip-flop memory, or any other device capable of storing data. RAM may be a dynamic random-access memory (DRAM), synchronous DRAM (SDRAM), a static memory, such as static random-access memory (SRAM), and the like. In some implementations, processor(s) 102 and memory system 130 may be implemented as a single controller, e.g., as an FPGA. Memory system 130 may include multiple memory chips 130-1 . . . 130-N. In some implementations, each (or some) of memory chips 130-1 . . . 130-N may be accessed via multiple memory channels 132 that allow simultaneous write (store) and read (load) operations, e.g., simultaneous storing and/or reading of multiple units of data in the respective memory chip.

Memory chips 130-n may store various data 134, MACs 136 that authenticate and protect the data 134 against spoofing attacks, and counters that protect the data against replay attacks. In some implementations, the counters may be arranged into a tree of counters 138.

Computing device 100 may support one or more applications 140. Application(s) 140 supported by computing device 100 may include machine-learning application(s), graphics application(s), computational application(s), cryptographic application(s) (such as authentication, encryption, decryption, secure storage application(s), etc.), embedded application(s), external application(s), or any other types of application(s) that may be executed by computing device 100. Application(s) 140 may be instantiated on the same computing device 100, e.g., by an operating system executed by the processor 102 and residing in memory system 130. Alternatively, external application(s) may be instantiated by a guest operating system supported by a virtual machine monitor (hypervisor) operating on the computing device 100. In some implementations, the external application(s) may reside on a remote access client device or a remote server (not shown), with the computing device 100 providing computational support for the client device and/or the remote server.

Computing device 100 may include an input/output (I/O) interface 106 to facilitate connection of the computing device 100 to various peripheral hardware devices (not shown in FIG. 1) such as card readers, terminals, printers, scanners, IoT devices, and the like. Computing device 100 may further include a network interface 108 to facilitate connection to a variety of networks (Internet, wireless local area networks (WLAN), personal area networks (PAN), public networks, private networks, etc.), and may include a radio front end module and other devices (amplifiers, digital-to-analog and analog-to-digital converters, dedicated logic units, etc.) to implement data transfer to/from computing device 100. Various hardware components of the computing device 100 may be connected via a system bus 110 that may include separate logic circuits, e.g., a bus interface logic unit (not shown in FIG. 1).

Figure 2:
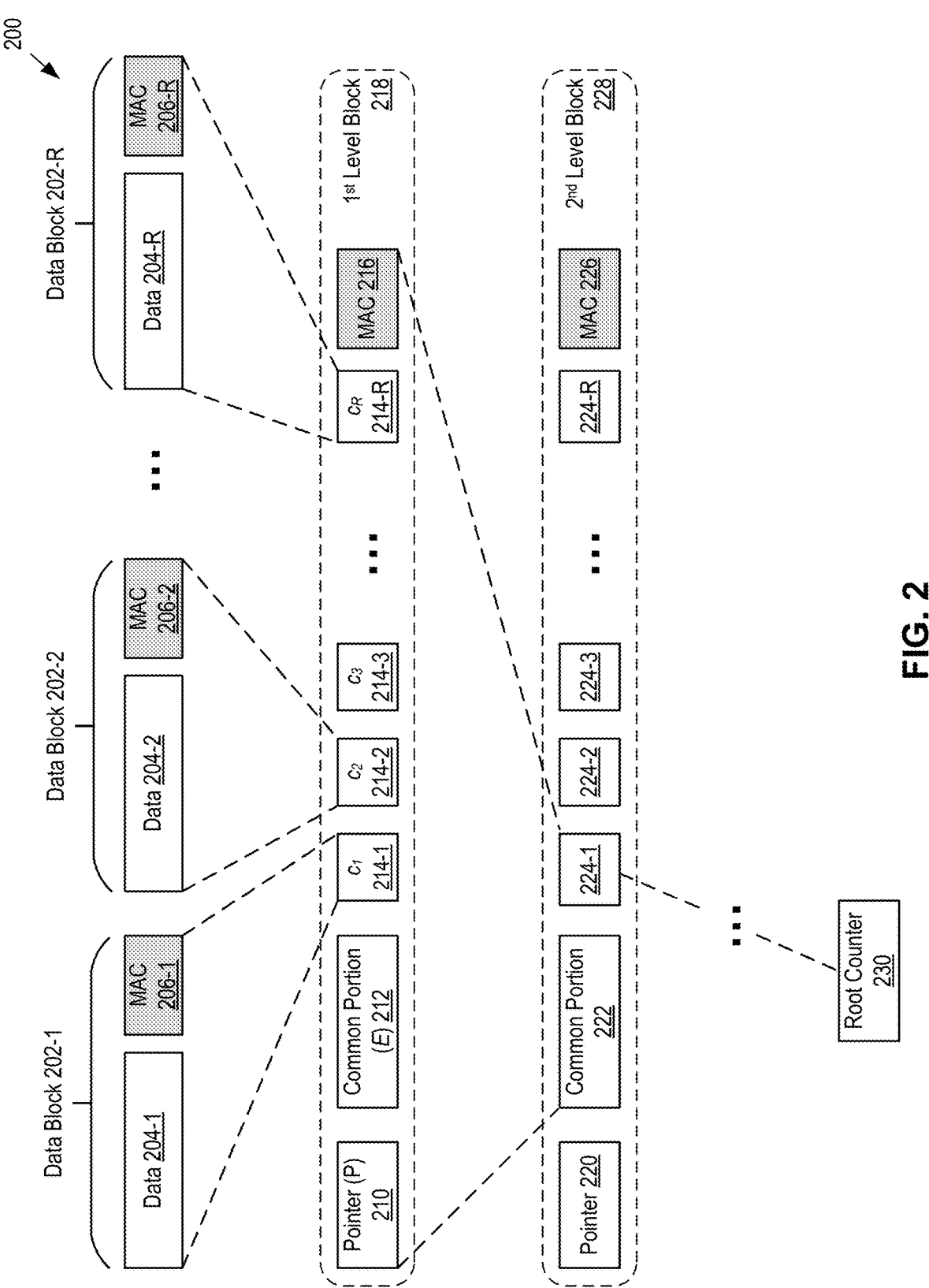
FIG. 2 is a diagram illustrating example architecture that facilitates protection of memory operations against replay attacks using split counters with dynamic epoch tracking, in accordance with some aspects of the present disclosure.

FIG. 2 is a diagram illustrating example architecture 200 that facilitates protection of memory operations against replay attacks using split counters with dynamic epoch tracking, in accordance with some aspects of the present disclosure. In some implementations, architecture 200 may include a cryptographic accelerator 120 (e.g., supported by dynamic epoch tracking component 126) of FIG. 1. The top row in FIG. 2 illustrates schematically a sequence of data blocks 202-1, 202-2 . . . 202-R. In some implementations, different data blocks 202-n may be stored using different cache lines. In some implementations, different data blocks 202-n may be stored in the same memory device, e.g., on the same memory chip 130-1, 130-2, etc. In some implementations, different blocks 202-n may be stored in separate memory chips. Each data block 202-1, 202-2 . . . 202-R may include data 204-1, 204-2 . . . 204-R and a respective MAC 206-1, 206-2 . . . 206-R that authenticates the data. Each data 204-n may be encrypted using any suitable cipher, e.g., 128-bit, 192-bit, or 256-bit Advanced Encryption Standard (AES) algorithm, AES-GCM (Galois Counter Mode) algorithm, AES-XTS algorithm, SM4 algorithms, and the like. MACs 206-i may be computed using any suitable block cipher algorithm, a cryptographic hash function (e.g., one-key MAC, parallelizable MAC, counter MAC, and the like), hash-based MAC (HMAC), or any other cryptographic primitive.

Encryption of a given data 204-i may involve using a corresponding counter $C_i$, which may be used as a nonce (e.g., concatenated or otherwise combined with a cryptographic key) during the encryption process. Counter $C_i$ may include a common portion E 212 (indicating the epoch) and an individual portion $c_i$ 214-i. In some implementations, counter $C_i$ may be obtained by concatenating common portion 212 and individual portion 214-i: $C_i = E \| c_i$. In some implementations, common portion 212 may be shifted by an offset 0: $C_i = (E+0) \| c_i$. In some implementations, common portion 212 may be shifted and multiplied by a scaling factor k and then added to individual portion 214-i: $C_i = (E+0) \cdot k + c_i$. Various other schemes to obtain $C_i = f(E, c_i)$ may be used, where $f(\cdot)$ is some function of E and $c_i$ such that a set $f(E, \{c_i\})$ does not overlap with the set $f(E+1, \{c_i\})$ for various values of E.

A set of counters $C_1, C_2 \ldots C_R$ may be authenticated with MAC 216, which may be computed using the same or a different authentication algorithm than used for obtaining MACs 206-1, 206-2 . . . 206-R. A change (e.g., increment) of one or more values $C_i$ (e.g., as a result of incrementing the corresponding individual portions $c_i$) causes the processing device (e.g., cryptographic accelerator 120) to recompute MAC 216. In some implementations, common portion 212, individual portions 214-$i$, and MAC 216 may be stored in the same first level block 218 (e.g., a 512-bit block, a 1024-bit block, and so on), corresponding to a first level of a counter tree. First level block 218 may additionally store pointer P 210 that indicates which counters $C_i$ are on the current epoch E and which counters $C_i$ are on a different, e.g., next epoch E+1, as described in more detail in conjunction with FIG. 3.

The apportionment of the first level block 218 among pointer 210, common portion 212, individual portions 214-$i$, and MAC 216 may be performed in any suitable manner, which may depend on a specific application that uses data 204-$n$, the number of updates/rewrites of the data 204-$n$ over the instance of the application, between system reboots, and the like, e.g., to ensure that counters do not repeat over the lifetime of data. In one non-limiting example, the size of one block may be 512 bits with a 6-bit pointer 210, a 58-bit common portion 212, sixty four individual 6-bit portions $c_1$, $c_2$ . . . $c_{64}$ 214-$n$, and 64-bit MAC 216.

Each first level block (only one is shown in FIG. 2 for conciseness), e.g., first level block 218 may protect R blocks 202-$n$ against replay attacks. Similarly, each first level block may be protected by a corresponding counter of the second level of the tree of counters. For example, as shown in FIG. 2, first level block 218 may be protected with a counter that includes a common portion 222 and an individual portion 224-1 and is a part of a second level block 228. Similarly, other counters that include common portion 222 and respective individual portions 224-2, 224-3 . . . 224-R of second level block 228 may protect other blocks of the first level not explicitly depicted in FIG. 2. Second level block 228 may further include pointer 220 and MAC 226. The functionality of various parts of second level block 228 may be similar to the corresponding functionality of first level block 218 described above. Although in the illustration of FIG. 2 the number of counters R in each level's block is the same, the number of counters in blocks of different levels may be different, in some implementations.

The tree of counters may include any number of additional levels of hierarchical counters in which one counter of n+1th level authenticates multiple (e.g., R) counters of nth level. One or more root counters 230 (which may be stored in a secure memory) may be at the bottom level of the tree of counters.

Figures 3A, 3B:
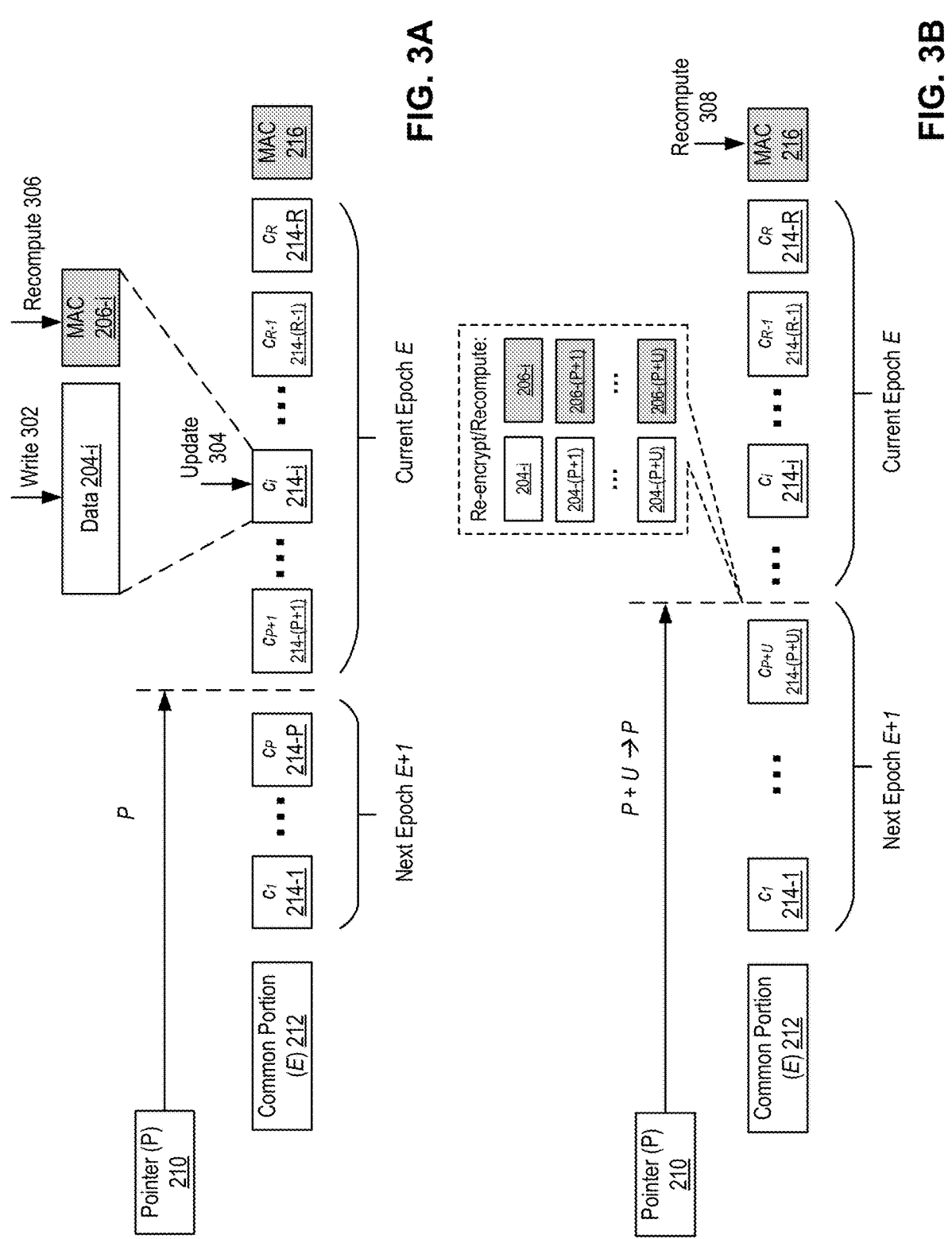
FIGS. 3A-B are diagrams illustrating example operations of split counters with dynamic epoch tracking for efficient protection of data against replay attacks, in accordance with some aspects of the present disclosure.

FIGS. 3A-B are diagrams illustrating example operations of split counters with dynamic epoch tracking for efficient protection of data against replay attacks, in accordance with some aspects of the present disclosure. For the sake of concreteness, FIGS. 3A-B illustrate operations performed in relation to a first level block 218 of counters depicted in FIG. 2, but it should be understood that the same or similar operations may be performed for counters of any other level of the tree of counters that are used to protect stored data against replay attacks. FIG. 3A illustrates an instance where a write (302) request is executed to overwrite data 204-$i$ previously stored in the memory. Data 204-$i$ may be protected by stored MAC 206-$i$ and counter $C_i$ having common portion E 212 and individual portion $c_i$ 214-$i$. Overwriting or otherwise updating data 204-$i$ may, therefore, include updating (304) individual portion $c_i$ 214-$i$, e.g., replacing $c_i$ with an incremented value $c_i \rightarrow c_i + 1$, encrypting new data 204-$i$ (e.g., using the incremented counter $C_i$ as a nonce value that may be appended or otherwise combined with a cryptographic key), and recomputing (306) and storing a new value of MAC 206-$i$ that authenticates data 204-$i$.

As further illustrated in FIG. 3A, prior to write (302), pointer 210 may have a value P that indicates the boundary between counters that are on the current epoch E from counters that are on the next epoch E+1. More specifically, when integrity of data 204-$i$ is to be verified (e.g., in conjunction with a read operation), the corresponding counter value may be taken as $C_{i>P} = E \| c_i$, provided that the corresponding counter is on the current epoch. On the other hand, when data 204-$i$ is on the next epoch, the corresponding counter value may taken as $C_{i \leq P} = (E+1) \| c_i$.

As illustrated in FIG. 3B, as a result of a write (302) operation (and counter and MAC updates) pointer P may be changed, e.g., $P \rightarrow P+U$, such that the boundary between the epochs is moved by U counters. The decision to select a specific update value U may be made according to any one of multiple possible schemes for advancing (U≠0) or maintaining (U=0) pointer 210. In some implementations, the rules may be set to allow any counter $C_k$ to be reached by pointer 210 before the individual portion 214-$k$ of that counter overflows. In some implementations, the maximum value $U_{max}$ may be set at $U_{max} = R/2^d$ (or greater), where d is the size (e.g., number of bits) in each individual portion 214-$k$. This choice ensures that, in the worst case when the last counter $C_R$ is updated repeatedly (as a result of repeated overwrites of data 204-R), pointer 210 is advanced by $U_{max}$ each time to guarantee that pointer 210 reaches the last counter $C_R$ when its individual portion 214-R overflows.

In some implementations, pointer 210 may be advanced by a minimum amount U sufficient to ensure that counter $C_i$ can be reached by pointer 210 before counter $C_i$ overflows. For example, the advance U may be selected based on comparison of the distance from pointer 210 to individual portion 214-$i$, e.g., i–P, with the number of updates, $\Delta_i = 2^d - c_i$, remaining for the individual portion 214-$i$ in the current epoch. More specifically, if $i-P = U_{max} \cdot \Delta_i$, pointer 210 may be advanced by $U=U_{max}$; if $i-P=U_{max} \cdot \Delta_i -1$, pointer 210 may be advanced by $U=U_{max}-1$; if $i-P=U_{max} \cdot \Delta_i -2$, pointer 210 may be advanced by $U=U_{max}-2$; and so on.

In some implementations, pointer 210 may be advanced by $$U = \min\left( i - P - U_{max}(\Delta_i - 1), \left\lceil \frac{i-P}{\Delta_i} \right\rceil \right)$$

provided that this value U is positive, or maintained at the current value P otherwise. In the implementations where $U_{max}$ is static and is at least $R/2^d$, the first argument in the function min( ) does not exceed the second argument and the formula assumes the form of $U = i-P-U_{max}(\Delta_i -1)$, which ensures that $U \leq U_{max}$. Numerous other schemes of selecting pointer updates U in view of i–P and $\Delta_i$ may be devised. Although in the above examples, it was assumed that i≥P, similar operations may be performed when i<P. In such instances, the distance from pointer 210 may be computed as $R-(P-i) \equiv (i-P) \bmod R$, which corresponds to the number of counters that pointer 210 has to advance to catch up with ith counter, e.g., by reaching the end of the sequence of counters and starting a new progression from the value P=R mod R=0.

Upon each advance of pointer 210, the processor performing operations illustrated in FIGS. 3A-B may recompute (308) MAC 216 using updated values $C_i$ and $C_{P+1}$ . . .

$C_{P+U}$ and the unchanged values $C_1 \ldots C_P$, $C_{P+U+1} \ldots C_{i-1}$, $C_{i+1} \ldots C_R$ (assuming for concreteness here that i>P+U). In some implementations, the individual portions of the counters $C_{P+1} \ldots C_{P+U}$ reassigned from the current epoch E to the next epoch E+1 can be nullified, so that all counters $C_{P+1}$ . . . $C_{P+U}$ are given the same new value (E+1)‖0. The processor may also re-encrypt data 204-i, 204-(P+1) . . . 204-(P+U) using the updated values $C_i$ and $C_P \ldots C_{P+U}$ and recompute the corresponding MACs 206-i, 206-(P+1) . . . 206-(P+U). Furthermore, the processor may update the affected counters of the lower levels of the tree, which may be tracked with respective pointers using operations that are similar to the operations described in conjunction with FIGS. 3A-B.

When pointer 210 reaches the end of the sequence of counters (P=R or, equivalently, P=0), common portion 212 may be updated, e.g., incremented E→E+1, with all counters being now on the next epoch E+1 that becomes the current epoch. Pointer P then begins a new progression through the sequence of counters tracking the boundary between counters on the current epoch E+1 and counters on the next epoch E+2. This process may continue for the lifetime of the data, the duration of the application that generates and uses the data, until the next system reboot, or for any other desired duration.

In some implementations, pointer 210 may be advanced using a finite state machine (FSM), which may be implemented as one or more hardware circuits. More specifically, the values i–P (or (i–P) mod R) and $\Delta_i$ may be used as the input into the FSM and the output U may include one of the values 0, 1, . . . $U_{max}$ (states of the FSM).

In some implementations, the maximum value $U_{max}$ may be adjusted dynamically, e.g., increased or decreased depending on the uniformity of writes across different units of data, e.g., with lower values of $U_{max}$ used when all units of data are overwritten with approximately the same frequency and higher values of $U_{max}$ used when some of the units of data are overwritten with higher frequency than the other units. In some implementations, different classes of split counters may be assigned individual portions of different sizes. For example, instead of assigning 384 bits allocated to individual portions uniformly across sixty four counters (with 6 bits per counter), 24 class-1 high-traffic counters may be assigned 12 bits each while 40 class-2 low-traffic counters may be assigned 2 bits each, or 32 class-1 high-traffic counters may be assigned 9 bits each while 32 class-2 low-traffic counters may be assigned 3 bits each, or any other suitable scheme.

In some implementations, multiple pointers $P_1 \ldots P_m$ may be used to track m+1 different epochs with pointer $P_1$ tracking boundary between epoch E and epoch E+1, pointer $P_2$ tracking boundary between epoch E+1 and epoch E+2, and so on. The common portion of the counters may store the value of the smallest (current) epoch E and the values of the counters $C_i$ may be read as $C_i$=E‖$c_i$, or $C_i$=(E+1)‖$c_i$, or $C_i$=(E+2)‖$c_i$, and so on, depending on the epoch to which the ith counter belongs. When a pointer completes its progression through the sequence of counters, the value of the pointer returns to zero (as R mod R=0) and the pointer begins a new progression, accompanied with the change of the current epoch from E to E+1.

Figure 4:
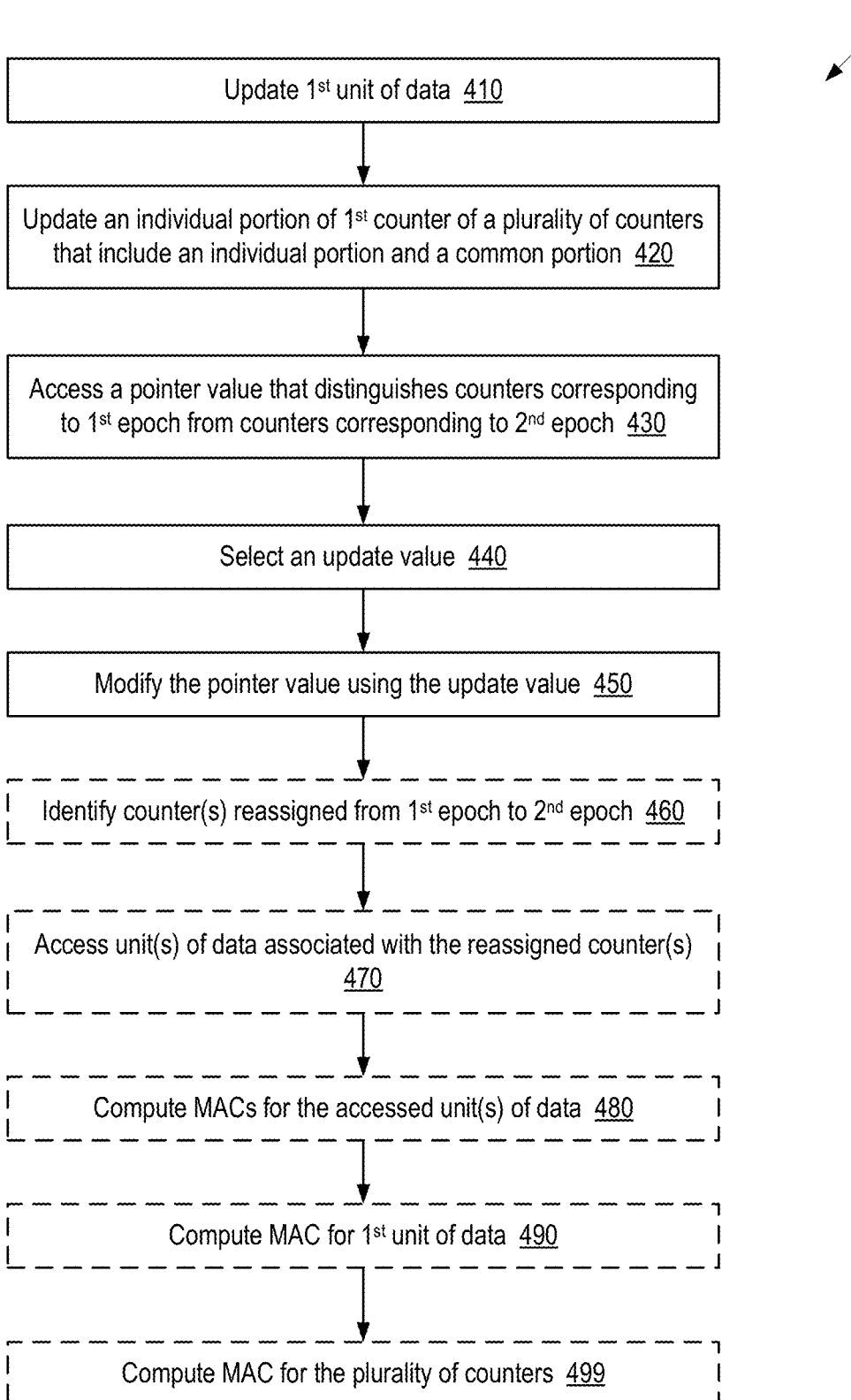
FIG. 4 is a flow diagram illustrating an example method of performing write operations using split counters with epoch tracking for protection of data against replay attacks, in accordance with some implementations of the present disclosure.
Figure 5:
FIG. 5 is a flow illustrating an example method of performing read operations using split counters with epoch tracking for protection of data against replay attacks, in accordance with some implementations of the present disclosure.
Figure 5:
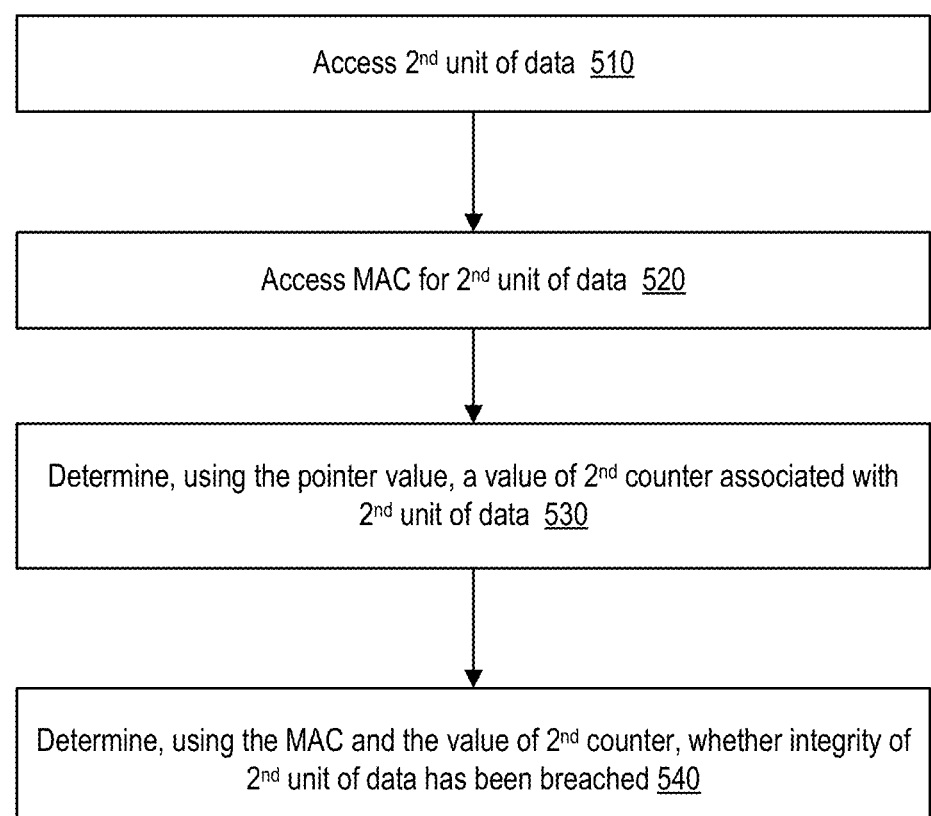

FIGS. 4-5 illustrate example methods 400 and 500 that may be used for efficient protection of memory against replay attacks using split counters with dynamic epoch tracking. In some implementations, methods 400 and/or 500 and each of their individual functions, routines, subroutines, and/or operations may be performed by a cryptographic accelerator 120 using dynamic epoch tracking component 126 illustrated in FIG. 1. In some implementations, methods 400 and/or 500 may be performed using a general-purpose processor, such as processor 102. Various blocks of methods 400 and/or 500 may be performed in a different order compared with the order shown in FIG. 4 and/or FIG. 5. Some blocks may be performed concurrently with other blocks. Some blocks may be optional. Methods 400 and/or 500 may be implemented as part of data write and read operations or as part of a network data communication operation. In certain implementations, a single processing thread may perform methods 400 and/or 500. Alternatively, two or more processing threads may perform methods 400 and/or 500, different threads executing one or more individual functions, routines, subroutines, or operations of methods 400 and/or 500. In an illustrative example, the processing threads implementing methods 400 and/or 500 may be synchronized (e.g., using semaphores, critical sections, and/or other thread synchronization mechanisms). Alternatively, the processing threads implementing methods 400 and/or 500 may be executed asynchronously with respect to each other. Various operations of each of methods 400 and/or 500 may be performed in a different order compared with the order shown in FIGS. 4-5. Some operations of each of methods 400 and 500 may be performed concurrently with other operations. Some operations may not always be performed.

FIG. 4 is a flow diagram illustrating an example method 400 of performing write operations using split counters with epoch tracking for protection of data against replay attacks, in accordance with some implementations of the present disclosure. At block 410, processing units performing method 400 may update a first stored unit of data (e.g., data 204-i in FIG. 3A) of a plurality of stored units of data (e.g., data 204-1 . . . 204-R in FIG. 2).

At block 420, method 400 may continue with updating an individual portion of a first counter (e.g., individual portion 214-i in FIG. 3A) of a plurality of counters. Each of the plurality of counters may be associated with a corresponding stored unit of data of the plurality of stored units of data. Each of the plurality of counters may include an individual portion (e.g., individual portions 214-1 . . . 214-R in FIG. 3A) of a respective counter and a common portion (e.g., common portion 212 in FIG. 3A) shared by the plurality of counters. The plurality of counters may be associated with the top level of a tree of counters (e.g., the plurality of counters may be included in first level block 218 in FIG. 2). The tree of counters may include two or more levels. A bottom level of the tree of counters may include one or more root counters (e.g., root counter 230 in FIG. 2). The one or more root counters may be stored in a secure memory location, e.g., a location in an on-chip memory. Updating the individual portion of the first counter may include incrementing a value of the individual portion by one (e.g., replacing $c_i$ with $c_i$+1).

At block 430, method 400 may continue with the processing device accessing a pointer value (e.g., value P of pointer 210 in FIG. 3A) that distinguishes a first subset of the plurality of counters corresponding to a first epoch for the common portion (e.g., current epoch E in FIG. 3A) from a second subset of the plurality of counters corresponding to a second epoch for the common portion (e.g., next epoch E+1 in FIG. 3A).

At block 440, processing device performing method 400 may select, based on at least the pointer value (e.g., value P) and a value of the individual portion of the first counter (e.g., $c_i$), an update value (e.g., value U). In some implementations, selecting the update value may be further based on a difference (e.g., $\Delta_i$). between a maximum value that can be stored in the individual portion of the first counter (e.g., $2^d$ or $2^d-1$) and the value (e.g., $c_i$) of the individual portion of the first counter. In some implementations, the update value may be selected from a set of values not exceeding four. At block 450, method 400 may continue with the processing device modifying the pointer value using the update value (e.g., replacing P with P+U).

In some implementations, method 400 may include, at block 460, identifying, responsive to modifying the pointer value, one or more counters of the first subset that have been reassigned to the second subset (e.g., counters with individual portions 214-(P+1) . . . 214-(P+U)). At block 470, method 400 may include accessing one or more stored units of data associated with the one or more reassigned counters (e.g., data 204-(P+1) . . . 204-(P+U)). At block 480, method 400 may continue with computing one or more MACs for the one or more stored units of data. In some implementations, computing each of the one or more MACs may include re-encrypting a respective stored unit of data (e.g., data 204-(P+1) . . . 204-(P+U)) in view of a value of a respective counter. In particular, re-encrypting unit of data 204-(P+1) may be performed in view of the value $C_{P+1} = (E+1)\|0$ of the respective counter).

At block 490, the processing device performing method 400 may compute a MAC for the first stored unit of data (e.g., MAC 206-$i$ of FIG. 3A). At block 499, method 400 may include computing a MAC for the plurality of counters (e.g., MAC 216 of FIG. 3A). Computing the MAC for the plurality of counters may be performed using the MAC for the first stored unit of data (e.g., MAC 206-$i$ of FIG. 3A) and the MACs for each of the one or more stored units of data (e.g., MACs 206-(P+1) . . . 206-(P+U)).

FIG. 5 is a flow illustrating an example method 500 of performing read operations using split counters with epoch tracking for protection of data against replay attacks, in accordance with some implementations of the present disclosure. At block 510, the processing device performing method 500 may access a second stored unit of data of a plurality of stored units of data (e.g., any stored unit of data 204-$j$ of the plurality of stored units of data 204-1 . . . 204-R). At block 520, method 500 may continue with accessing a MAC for the second stored unit of data (e.g., MAC 206-$j$).

At block 530, the processing units performing method 500 may determine, using the pointer value, a value of a second counter (e.g., counter $C_j$) associated with the second stored unit of data. In some implementations, the value of the second counter may be a value of an individual portion of the second counter (e.g., $c_j$) concatenated with a value of the common portion (e.g., E), provided that the second counter is associated with the first epoch (e.g., j>P), or the value of an individual portion of the second counter concatenated with an incremented value of the common portion (e.g., $C_j = (E+1)\|c_j$), provided that the second counter is associated with the second epoch (e.g., j≤P). In some implementations, the value of the second counter may be the value of the individual portion of the second counter added to a rescaled value of the common portion (e.g., $C_j = E \cdot k + c_j$, with some scaling factor k), provided that the second counter is associated with the first epoch, or the value of an individual portion of the second counter added to a rescaled incremented value of the common portion (e.g., $C_j = (E+1) \cdot k + c_j$), provided that the second counter is associated with the second epoch.

At block 540, method 500 may include determining, using the MAC and the value of the second counter, whether integrity of the second stored unit of data has been breached. For example, the processing device may decrypt the stored unit of data 204-$j$ and use the counter value to compute a verification MAC for the unit of data 204-$j$. The processing device may then compare the verification MAC with MAC (e.g., MAC 206-$j$) accessed at block 520. If the two MACs differ from each other, the processing device may determine that a likely replay attack has occurred.

Figure 6:
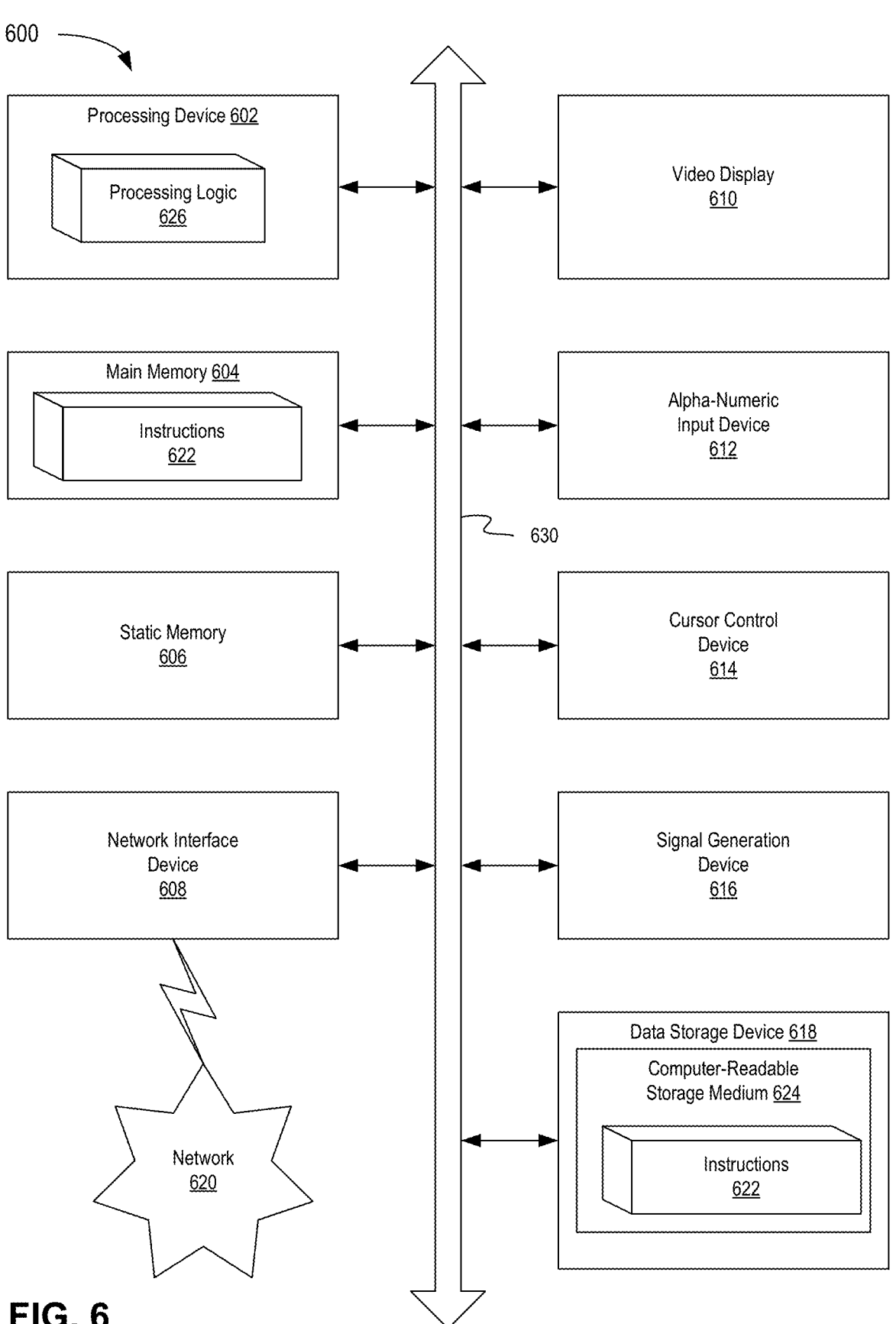
FIG. 6 depicts a block diagram of an example computer system operating in accordance with one or more aspects of the present disclosure.

FIG. 6 depicts an example computer system 600 that can perform any one or more of the methods described herein, in accordance with some implementations of the present disclosure. The computer system may be connected (e.g., networked) to other computer systems in a LAN, an intranet, an extranet, or the Internet. The computer system may operate in the capacity of a server in a client-server network environment. The computer system may be a personal computer (PC), a tablet computer, a set-top box (STB), a Personal Digital Assistant (PDA), a mobile phone, a camera, a video camera, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The example computer system 600 includes a processing device 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 618, which communicate with each other via a bus 630.

Processing device 602 (which can include processing logic 626) represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute instructions 622 that implement techniques of the present disclosure.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker). In one illustrative example, the video display unit 610, the alphanumeric input device 612, and the cursor control device 614 may be combined into a single component or device (e.g., an LCD touch screen).

The data storage device 618 may include a computer-readable storage medium 624 on which is stored the instructions 622 embodying any one or more of the methodologies or functions described herein. The instructions 622 may also reside, completely or at least partially, within the main memory 604 and/or within the processing device 602 during execution thereof by the computer system 600, the main memory 604 and the processing device 602 also constituting computer-readable media. In some implementations, the instructions 622 may further be transmitted or received over a network via the network interface device 608.

While the computer-readable storage medium 624 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operations may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the aspects of the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "selecting," "storing," "analyzing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description. In addition, aspects of the present disclosure are not described with reference to any particular programming language. It will be appreciated that a variety of programming languages may be used to implement the teachings of the present disclosure as described herein.

Aspects of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read-only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Furthermore, the terms "first," "second," "third," "fourth," etc. as used herein are meant as labels to distinguish among different elements and may not necessarily have an ordinal meaning according to their numerical designation.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

What is claimed is:

1. A method to perform a cryptographic operation, the method comprising:

updating, using a processing device, a first unit of data of a plurality of units of data;

updating, using the processing device, an individual portion of a first counter of a plurality of counters, wherein each of the plurality of counters is associated with a corresponding unit of data of the plurality of units of data and comprises:

an individual portion of a respective counter, and a common portion shared by the plurality of counters;

accessing, using the processing device, a pointer value that distinguishes a first subset of the plurality of counters corresponding to a first epoch for the common portion from a second subset of the plurality of counters corresponding to a second epoch for the common portion;

selecting, using the processing device, based on at least the pointer value and a value of the individual portion of the first counter, an update value; and modifying, using the processing device, the pointer value using the update value, wherein the update value comprises a number of one or more counters re-assigned from the first subset of the plurality of counters to the second subset of the plurality of counters.

2. The method of claim 1, wherein the plurality of counters is associated with a top level of a tree of counters, wherein the tree of counters comprises two or more levels, and wherein a bottom level of the tree of counters comprises one or more root counters stored in a secure memory location.

3. The method of claim 2, where the secure memory location is in an on-chip memory.

4. The method of claim 2, wherein updating the individual portion of the first counter comprises incrementing the value of the individual portion of the first counter.

5. The method of claim 1, further comprising:

accessing a second unit of data of the plurality of units of data;

accessing a message authentication code (MAC) for the second unit of data;

determining, using the pointer value, a value of a second counter of the plurality of counters, wherein the second counter is associated with the second unit of data; and determining, using the MAC and the value of the second counter, whether integrity of the second unit of data has been breached.

6. The method of claim 5, wherein the value of the second counter is one of:

a value of an individual portion of the second counter concatenated with a value of the common portion, provided that the second counter is associated with the first epoch; or the value of the individual portion of the second counter concatenated with an incremented value of the common portion, provided that the second counter is associated with the second epoch.

7. The method of claim 5, wherein the value of the second counter is one of:

a value of an individual portion of the second counter added to a rescaled value of the common portion, provided that the second counter is associated with the first epoch; or the value of the individual portion of the second counter added to a rescaled incremented value of the common portion, when the second counter is associated with the second epoch.

8. The method of claim 1, further comprising:

responsive to modifying the pointer value, identifying the one or more counters of the first subset that have been reassigned to the second subset;

accessing one or more units of data associated with the one or more reassigned counters; and computing one or more message authentication codes (MACs) for the one or more units of data.

9. The method of claim 8, wherein computing each of the one or more MACs comprises re-encrypting a respective unit of the one or more units of data in view of a value of a respective counter of the one or more identified counters.

10. The method of claim 8, further comprising:

computing a message authentication code (MAC) for the first unit of data; and computing, using the MAC for the first unit of data and the one or more MACs for the one or more units of data, a MAC for the plurality of counters.

11. The method of claim 1, wherein selecting the update value is further based on a difference between a maximum value that can be stored in the individual portion of the first counter and the value of the individual portion of the first counter.

12. The method of claim 11, wherein the update value is selected from a set of values not exceeding four.

13. A system comprising:

a memory system; and a processing device operatively coupled to the memory system, the processing device to:

update a first unit of data of a plurality of units of data;

update an individual portion of a first counter of a plurality of counters, wherein each of the plurality of counters is associated with a corresponding unit of data of the plurality of units of data and comprises:

an individual portion of a respective counter, and a common portion shared by the plurality of counters;

access a pointer value that distinguishes a first subset of the plurality of counters corresponding to a first epoch for the common portion from a second subset of the plurality of counters corresponding to a second epoch for the common portion;

select, based on at least the pointer value and a value of the individual portion of the first counter, an update value; and modify the pointer value using the update value, wherein the update value comprises a number of one or more counters re-assigned from the first subset of the plurality of counters to the second subset of the plurality of counters.

14. The system of claim 13, wherein to update the individual portion of the first counter, the processing device is to increment the value of the individual portion of the first counter.

15. The system of claim 13, wherein the processing device is further to:

access a second unit of data of the plurality of units of data;

access a message authentication code (MAC) for the second unit of data;

determine, using the pointer value, a value of a second counter of the plurality of counters, wherein the second counter is associated with the second unit of data; and determine, using the MAC and the value of the second counter, whether integrity of the second unit of data has been breached.

16. The system of claim 13, wherein the processing device is further to:

identify the one or more counters of the first subset that have been reassigned to the second subset;

access one or more units of data associated with the one or more reassigned counters; and compute one or more message authentication codes (MACs) for the one or more units of data.

17. The system of claim 16, wherein to compute each of the one or more MACs, the processing device is to re-encrypt a respective unit of the one or more units of data in view of a value of a respective counter of the one or more identified counters.

18. The system of claim 16, wherein the processing device is further to:

compute a message authentication code (MAC) for the first unit of data; and compute, using the MAC for the first unit of data and the one or more MACs for the one or more units of data, a MAC for the plurality of counters.

19. The system of claim 13, wherein the processing device to select the update value further based on a difference between a maximum value that can be stored in the individual portion of the first counter and the value of the individual portion of the first counter.

20. A non-transitory computer-readable storage medium storing instructions thereon that, when executed by a processing device, cause the processing device to:

update a first unit of data of a plurality of units of data;

update an individual portion of a first counter of a plurality of counters, wherein each of the plurality of counters is associated with a corresponding unit of data of the plurality of units of data and comprises:

an individual portion of a respective counter, and a common portion shared by the plurality of counters;

access a pointer value that distinguishes a first subset of the plurality of counters corresponding to a first epoch for the common portion from a second subset of the plurality of counters corresponding to a second epoch for the common portion;

select, based on at least the pointer value and a value of the individual portion of the first counter, an update value; and modify the pointer value using the update value, wherein the update value comprises a number of one or more counters re-assigned from the first subset of the plurality of counters to the second subset of the plurality of counters.

* * * * *